United States Patent [19]

Kon

[11] Patent Number: 5,333,953
[45] Date of Patent: Aug. 2, 1994

[54] METHOD AND APPARATUS FOR CALCULATING THERMAL SENSITIVITY

[75] Inventor: Akihiko Kon, Kanagawa, Japan

[73] Assignee: Yamatake-Honeywell Co., Ltd., Tokyo, Japan

[21] Appl. No.: 95,894

[22] Filed: Jul. 19, 1993

Related U.S. Application Data

[63] Continuation of Ser. No. 763,963, Sep. 23, 1991, abandoned.

[30] Foreign Application Priority Data

Sep. 25, 1990 [JP] Japan .................. 2-256723

[51] Int. Cl.$^5$ .................. G01K 3/00; G01K 13/00; G06F 15/00
[52] U.S. Cl. .................. 374/109; 374/169; 364/557
[58] Field of Search .................. 374/109, 169; 364/557

[56] References Cited

U.S. PATENT DOCUMENTS

| | | | |
|---|---|---|---|
| 4,058,254 | 11/1977 | Hallgreen | 374/109 |
| 4,702,617 | 10/1987 | Crabtree et al. | 374/109 |
| 4,727,500 | 2/1988 | Jackson et al. | 364/557 |
| 4,799,176 | 1/1989 | Cacciatore | 364/557 |
| 4,863,279 | 9/1989 | Markel et al. | 374/109 |

FOREIGN PATENT DOCUMENTS 2416146 12/1974 Fed. Rep. of Germany ...... 374/109
0139251 10/1979 Japan .................. 374/109

OTHER PUBLICATIONS

"Thermal Environmental Conditions for Human Occupancy", ANSI/ASHRAE Standard 55-1981 (1981).

Primary Examiner—Diego F. F. Gutierrez
Attorney, Agent, or Firm—Blakely, Sokoloff, Taylor & Zafman

[57] ABSTRACT

The present invention provides a method and apparatus for calculating thermal sensitivity and predicted mean thermal sensitivity felt by a person in an environment. According to the apparatus of the present invention, an air temperature Ta, a clothing thermal resistance Icl, and a sensor temperature Tcr of a sensor within the environment are provided as input to an input section of the apparatus. Upon receiving these values, a set temperature calculating section of the apparatus calculates a set temperature $\theta_{(th)}$. A thermal energy control means supplies thermal energy information $H\theta_{(th)}$ to a heater so as to heat the sensor in order to maintain the sensor temperature Tcr at the calculated set temperature $\theta_{(th)}$. An equivalent temperature calculating section then calculates an equivalent temperature Teq* so that a predicted mean thermal sensitivity PMV* can then calculated on the basis of the obtained equivalent temperature Teq*.

12 Claims, 6 Drawing Sheets

METHOD AND APPARATUS FOR CALCULATING THERMAL SENSITIVITY

This is a continuation of application Ser. No. 07/763,963, filed Sep. 23, 1991, now abandoned.

BACKGROUND OF THE INVENTION

The present invention relates to a thermal sensitivity calculating apparatus for calculating thermal sensitivity, e.g., an equivalent temperature (Teq), felt by a human body, and a predicted mean thermal sensitivity calculating apparatus for calculating a PMV (Predicted Mean Vote) value as predicted mean thermal sensitivity representing the degree of comfort in an indoor environment.

The equivalent temperature Teq is used as an evaluation index of a thermal environment felt by a human body, i.e., thermal sensitivity.

As the first method of obtaining this equivalent temperature Teq, a method is proposed, in which an equivalent temperature Teq* substantially equal to the equivalent temperature Teq of the human body is obtained by measuring a radiant temperature Tr, an air temperature Ta, and an air velocity Vair by using different sensors, and performing predetermined arithmetic processing of the measured values. This method requires complicated arithmetic processing, and the processing time is undesirably prolonged.

Under the circumstances, as the second method of obtaining the equivalent temperature Teq, a method is proposed, in which a heater is incorporated in a module main body, and the amount of power to be supplied to the heater is controlled to maintain a temperature (sensor temperature) $T_{cr}$ of the module main body at a constant value (e.g., 36.5° C.). According to this method, the equivalent temperature Teq* can be calculated by measuring the amount of power to be supplied to the heater and performing predetermined arithmetic processing of the measured value.

In a conventional method, as a formula for calculating predicted mean thermal sensitivity PMV representing the degree of comfort in an indoor environment, the PMV equation defined by ISO 7730, i.e., the following equation (1), has been employed:

$$PMV = (0.303e^{-0.036M} + 0.028) \times [(M - W') - \quad (1)$$
$$3.05 \times 10^{-3} \cdot \{5733 - 6.99(M - W') - Pa\} -$$
$$0.42\{(M - W') - 58.15\} - 1.7 \times$$
$$10^{-5} \cdot M \cdot (5867 - Pa) - 0.0014 \cdot M \cdot (34 -$$
$$Ta) - 3.96 \cdot 10^{-8} \cdot fcl \cdot \{(Tcl + 273)^4 - (Tr + 273)^4\} - fcl \cdot hc \cdot (Tcl - Ta)]$$

for
$$Tcl = Tsk - 0.155 \cdot Icl \cdot [3.96 \times 10^{-8} \cdot fcl \cdot \{(Tcl + 273)^4 - (Tr + 273)^4\} + fcl \cdot hc \cdot (Tcl - Ta)]$$

$$hc = \begin{bmatrix} 2.38 \ (Tcl - Ta)^{0.25} \\ \text{for } 2.38 \ (Tcl - Ta)^{0.25} > 12.1 \sqrt{Vair} \\ 12.1 \sqrt{Vair} \\ \text{for } 2.38 \ (Tcl - Ta)^{0.25} \leq 12.1 \sqrt{Vair} \end{bmatrix}$$

Tcl = clothing surface temperature
Tsk = skin temperature
Pa = RH·Pa*
RH = humidity
Pa* = saturated water vapor pressure
M = activity amount
W' = work amount
Ta = air temperature
Tr = radiant temperature
Icl = clothing thermal resistance
Vair = air velocity
fcl = factor According to this method, the predicted mean thermal sensitivity PMV can be automatically calculated by measuring the respective parameters and substituting the measurements into equation (1).

In practice, however, it is difficult to measure all the parameters in a room of a building. Moreover, the above PMV equation itself is complicated.

Under the circumstances, the present applicant has proposed a method of obtaining a predicted mean sensitivity PMV*, as a value coinciding with the predicted mean sensitivity PMV with high accuracy, by using the above-mentioned equivalent temperature Teq* and simple formulae.

In the above-described second method of obtaining the equivalent temperature Teq, however, since an environment measuring section constituted by the module main body and the heater is much smaller than a human body, the air current sensitivity of the measuring section is much larger than that of the human body.

This difference in air current sensitivity indicates that the equivalent temperature Teq can be properly measured within a low air velocity region in which the air velocity Vair is about 0.1 m/s, whereas the deviation of the equivalent temperature Teq* from the equivalent temperature Teq is increased in an air velocity region in which the air velocity Vair is higher than 0.1 m/s, and accurate measurement cannot be performed. That is, even with a slight increase in the air velocity Vair, the equivalent temperature Teq* becomes much smaller than the equivalent temperature Teq because of the high air current sensitivity.

According to the second method described above, therefore, there is a critical drawback that accurate measurement cannot be performed when the air velocity Vair is high, in spite of the advantage that the radiant temperature Tr, the air temperature Ta, and the air velocity Vair can be integrally measured, i.e., the advantage that the arithmetic processing can be simplified.

The difference between the equivalent temperature Teq and the equivalent temperature Teq* affects arithmetic processing of the predicted mean thermal sensitivity PMV*. If the air velocity Vair is high, the predicted mean thermal sensitivity PMV* cannot be accurately obtained.

SUMMARY OF THE INVENTION

The present invention has as its object, according to a first embodiment of the present invention, to provide a method and apparatus for calculating thermal sensitivity, in which a set temperature $\theta_{(th)}$ is calculated on the basis of an air temperature Ta and a clothing thermal resistance Icl, thermal energy information $H\theta_{(th)}$ supplied to heating means which is capable of adjusting a sensor temperature Tcr so as to set the set temperature $\theta_{(th)}$ to be equal to the sensor temperature Tcr; and an equivalent temperature Teq* is calculated on the basis of the air temperature Ta, the set temperature $\theta_{(th)}$, a difference $\Delta Tcr$ between the sensor temperature Tcr and the set temperature $\theta_{(th)}$, an air velocity Vair, a coefficient $c_1$ expressed in consideration of the clothing thermal resistance Icl, coefficients $c_2$ to $c_6$, and a coefficient n, according to the following equation (b), when the sensor temperature Tcr is higher than the set temperature $\theta_{(th)}$, $$Teq = c_1 + c_2 \times \theta(th) + c_3 \times Ta + c_4 \times (1 + c_a \times Vair^n) \times \Delta Tcr - c_6 \times H\theta_{(th)} \quad (b)$$

According to a second embodiment of the present invention, there is provided a method and apparatus for calculating thermal sensitivity, in which a set temperature $\theta_{(th)}$ is calculated on the basis of an air temperature Ta and a clothing thermal resistance Icl, thermal energy information He(th) supplied to heating means which is capable of adjusting a sensor temperature Tcr so as to set the set temperature $\theta_{(th)}$ to be equal to the sensor temperature Tcr; and an equivalent temperature Teq* is calculated on the basis of the air temperature Ta, the set temperature $\theta_{(th)}$, the thermal energy information $H\theta_{(th)}$, and coefficients $b_1$ to $b_4$, according to the following equation (a), when the sensor temperature Tcr is lower than the set temperature $\theta_{(th)}$, whereas the equivalent temperature Teq* is calculated on the basis of the air temperature Ta, the set temperature $\theta_{(th)}$, a difference $\Delta Tcr$ between the sensor temperature Tcr and the set temperature $\theta_{(th)}$, an air velocity Vair, a coefficient $c_1$ expressed in consideration of the clothing thermal resistance Icl, coefficients $c_2$ to $c_6$, and a coefficient n, according to the following equation (b), when the sensor temperature Tcr is higher than the set temperature $\theta_{(th)}$, $$Teq = b_1 + b_2 \times \theta_{(th)} + b_3 \times Ta - b_4 \times H\theta_{(th)} \quad (a)$$

$$Teq = c_1 + c_2 \times \theta_{(th)} + c_3 \times Ta + c_4 \times (1 + c_5 \times Vair^n) \times \Delta Tcr - c_6 \times H\theta_{(th)} \quad (b)$$

According to a third embodiment of the present invention, there is provided a method and apparatus for calculating predicted mean thermal sensitivity, in which a set temperature $\theta_{(th)}$ is calculated on the basis of an air temperature Ta and a clothing thermal resistance Icl, thermal energy information $H\theta_{(th)}$ supplied to heating means which is capable of adjusting a sensor temperature Tcr so as to set the set temperature $\theta_{(th)}$ to be equal to the sensor temperature Tcr; an equivalent temperature Teq* is calculated on the basis of the air temperature Ta, the set temperature $\theta_{(th)}$, a difference $\Delta Tcr$ between the sensor temperature Tcr and the set temperature $\theta_{(th)}$, an air velocity Vair, a coefficient $c_1$ expressed in consideration of the clothing thermal resistance Icl, coefficients $c_2$ to $c_6$, and a coefficient n, according to the following equation (b), when the sensor temperature Tcr is higher than the set temperature $\theta_{(th)}$, and predicted mean thermal sensitivity PMV* is calculated on the basis of the obtained equivalent temperature Teq*, a humidity RH, an activity amount $M_{at}$, a skin temperature $T_{sk}$ ($T_{sk} = 35.7 - 0.0275 \times M_{et} \times 58.15$), the air temperature Ta, an absolute water vapor pressure P(Ta) at the air temperature Ta, the clothing thermal resistance Icl, a thermal resistance effect Fcl ($Fcl = E_1/(E_2 + E_3 \times IcL)$) based on coefficients $E_1$ to $E_3$, and coefficients $D_1$ to $D_7$, according to the following equation (c), $$Teq^* = c_1 + c_2 \times \theta_{(th)} + c_3 \times Ta + c_4 \times (1 + c_5 \times Vair^n) \times \Delta Tcr - c_6 \times H\theta_{(th)} \quad (b)$$

$$PMV^* = \alpha \times LOAD^* \quad (c)$$

where $\alpha = 0.303 \times EXP(-0.036 \times M_{et} \times 58.15) + 0.028$ if $M_{et} < 1.0$, then $$LOAD^* = D_1 + D_2 \times M_{et} - D_3 \times T_{sk} D_4 \times M_{et} \times Ta + (D_5 + D_6 \times M_{et}) \times RH \times P(Ta) - Fcl \times (T_{sk} - Teq^*)$$

if $M_{et} > 1.0$, then $$LOAD^* = D_1 + D_2 \times M_{et} - D_3 \times T_{sk} + D_4 \times M_{et} \times Ta + (D_5 + D_6 \times M_{et}) \times RH \times P(Ta) - D_7 \times (M_{et} - 1) - Fcl \times (T_{sk} - Teq^*)$$

According to a fourth embodiment of the present invention, there is provided a method and apparatus for calculating predicted mean thermal sensitivity, in which a set temperature $\theta_{(th)}$ is calculated on the basis of an air temperature Ta and a clothing thermal resistance Icl, thermal energy information $H\theta_{(th)}$ supplied to heating means capable of adjusting a sensor temperature Tcr so as to set the set temperature $\theta_{(th)}$ to be equal to the sensor temperature Tcr; an equivalent temperature Teq* is calculated on the basis of the air temperature Ta, the set temperature $\theta_{(th)}$, the thermal energy information $H\theta_{(th)}$, and coefficients $b_1$ to $b_4$, according to the following equation (a), when the sensor temperature Tcr is lower than the set temperature $\theta_{(th)}$, whereas the equivalent temperature Teq* is calculated on the basis of the air temperature Ta, the set temperature $\theta_{(th)}$, a difference $\Delta Tcr$ between the sensor temperature Tcr and the set temperature $\theta_{(th)}$, an air velocity Vair, a coefficient n expressed in consideration of the clothing thermal resistance Icl, coefficients $c_2$ to $c_6$, and a coefficient n, according to the following equation (b), when the sensor temperature Tcr is higher than the set temperature $\theta_{(th)}$, and predicted mean thermal sensitivity PMV* is calculated on the basis of the obtained equivalent temperature Teq*, a humidity RH, an activity amount $M_{et}$, a skin temperature $T_{sk}$ ($T_{sk} = 35.7 - 0.0275 \times M_{et} \times 58.15$), the air temperature Ta, an absolute water vapor pressure P(Ta) at the air temperature Ta, the clothing thermal resistance Icl, a thermal resistance effect Fcl ($Fcl = E_1/(E_2 + E_3 \times Icl)$) based on coefficients $E_1$ to $E_3$, and coefficients $D_1$ to $D_7$, according to the following equation (c), $$Teq^* = b_1 + b_2 \times \theta_{(th)} + b_3 \times Ta - b_4 \times H\theta_{(th)} \quad (a)$$

$$Teq^* = c_1 + c_2 \times \theta_{(th)} + c_3 \times Ta + c_4 \times (1 + c_5 \times Vair^n) \times \Delta Tcr - c_6 \times H\theta_{(th)} \quad (b)$$

$$PMV^* = \alpha \times LOAD^* \quad (c)$$

where $\alpha = 0.303 \times EXP(-0.036 \times M_{et} \times 58.15) + 0.028$ if $M_{et} < 1.0$, then $$LOAD^* = D_1 + D_2 \times M_{et} - D_3 \times T_{sk} + D_4 \times M_{et} \times Ta + (D_5 + D_6 \times M_{et}) \times RH \times P(Ta) - Fcl \times (T_{sk} - Teq^*)$$

if $M_{et} \geq 1.0$, then $$LOAD^* = D_1 + D_2 \times M_{et} - D_3 \times T_{sk} + D_4 \times M_{et} \times Ta + (D_5 + D_6 \times M_{et}) \times RH \times P(Ta) - D_7 \times (M_{et} - 1) - Fcl \times (T_{sk} - Teq^*)$$

According to the present invention, therefore, the set temperature $\theta_{(th)}$ is determined on the basis of the air temperature Ta and the clothing thermal resistance Icl, and the thermal energy information $H\theta_{(th)}$ is supplied to the heating means to make the set temperature $\theta_{(th)}$ coincide with the sensor temperature Tcr.

That is, the sensor temperature Tcr is controlled to be equal to the set temperature $\theta_{(th)}$ which is not constant and changes depending on environmental conditions.

According to the present invention, when the sensor temperature Tcr is higher than the set temperature $\theta_{(th)}$, i.e., the module main body is in a heated state in which the sensor temperature Tcr is higher than the set temperature the equivalent temperature Teq* is calculated on the basis of the air temperature Ta, the set temperature $\theta_{(th)}$, the difference $\Delta$Tcr, the air velocity Vair, the coefficients $c_1$ to $c_6$, and the coefficient n. In addition, when the sensor temperature Tcr is lower than the set temperature $\theta_{(th)}$, i.e., the module main body is set in a cooled state in which the thermal energy information $H\theta_{(th)}$ is required, th equivalent temperature Teq* is calculated on the basis of the air temperature Ta, the set temperature $\theta_{(th)}$, the thermal energy information $H\theta_{(th)}$, and the coefficients $b_1$ to $b_4$.

Therefore, according to the present invention, the predicted mean sensitivity PMV* is calculated by using the equivalent temperature Teq* obtained from either of the calculations above.

DETAILED DESCRIPTION

The present invention will be described in detail below.

Figure 2:
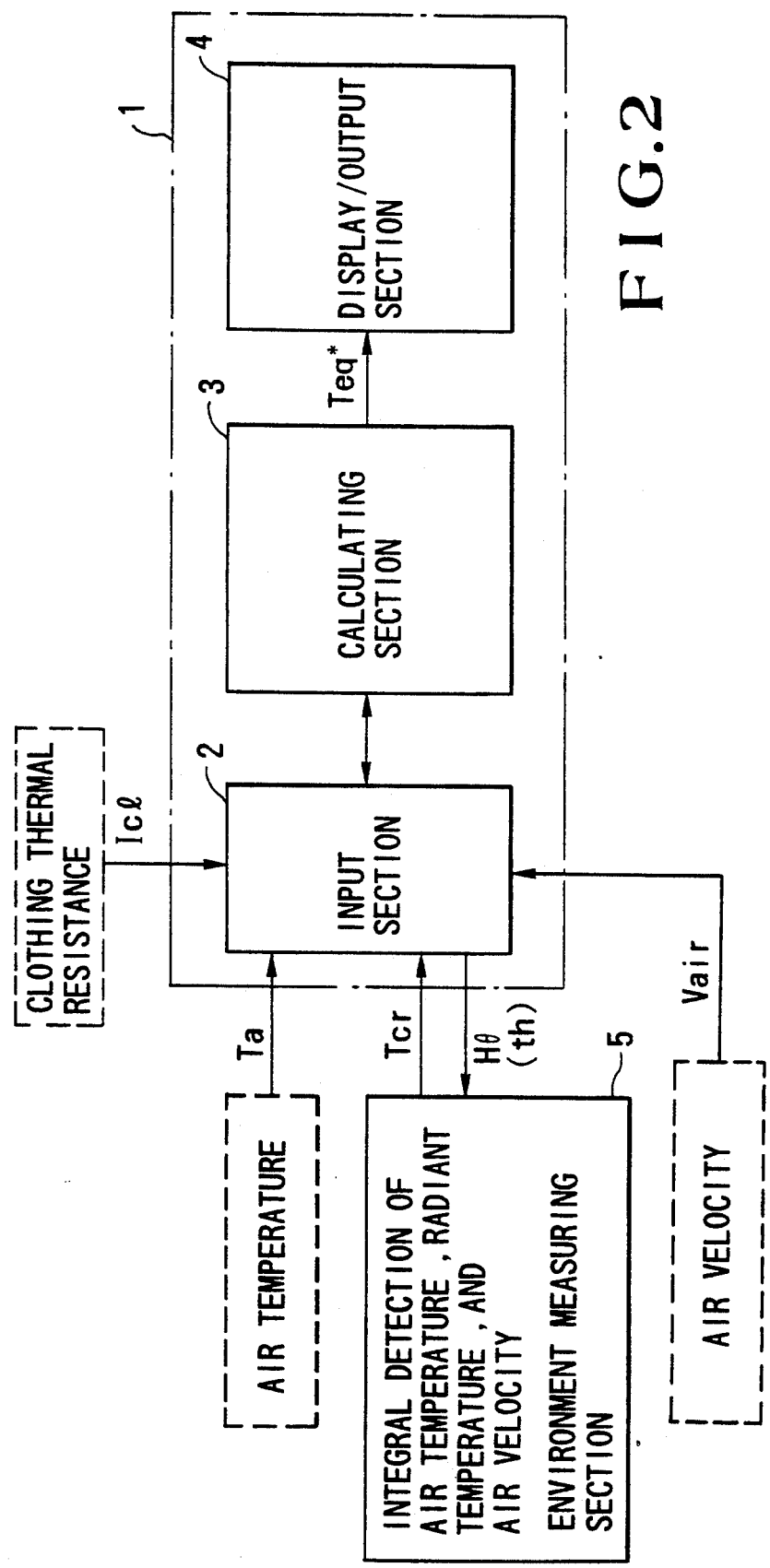
FIG. 2 is a block diagram showing the thermal sensitivity calculating apparatus according to an embodiment of the present invention.

FIG. 2 shows a thermal sensitivity calculating apparatus according to one embodiment of the present invention.

This thermal sensitivity calculating apparatus 1 comprises an input section 2, a calculating section 3, and a display/output section 4. The input section 2 receives not only a clothing thermal resistance Icl as a set value but also an air temperature Ta and a sensor temperature Tcr from an environment measuring section 5 as detection values. These set and detection values are then supplied from the input section 2 to the calculating section 3. The calculating section 3 then obtains a set temperature value $\theta_{(th)}$, heater power $H\theta_{(th)}$ as thermal energy, and an equivalent temperature Teq*.

Figure 1A:
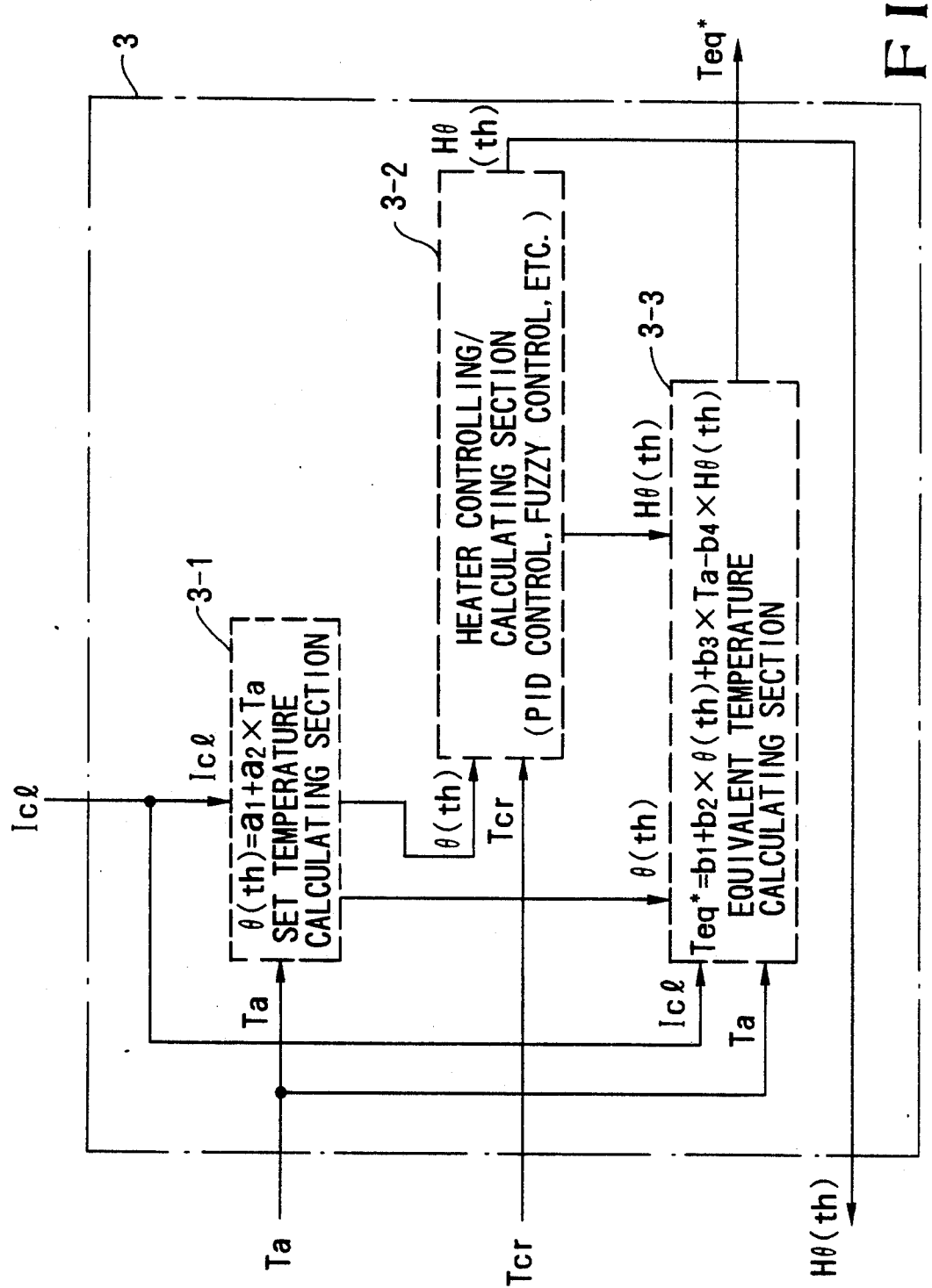
FIGS. 1(a) and 1(b) are block diagrams, each showing the process of arithmetic operations performed by a calculating section in a thermal sensitivity calculating apparatus in FIG. 2.
Figure 1B:
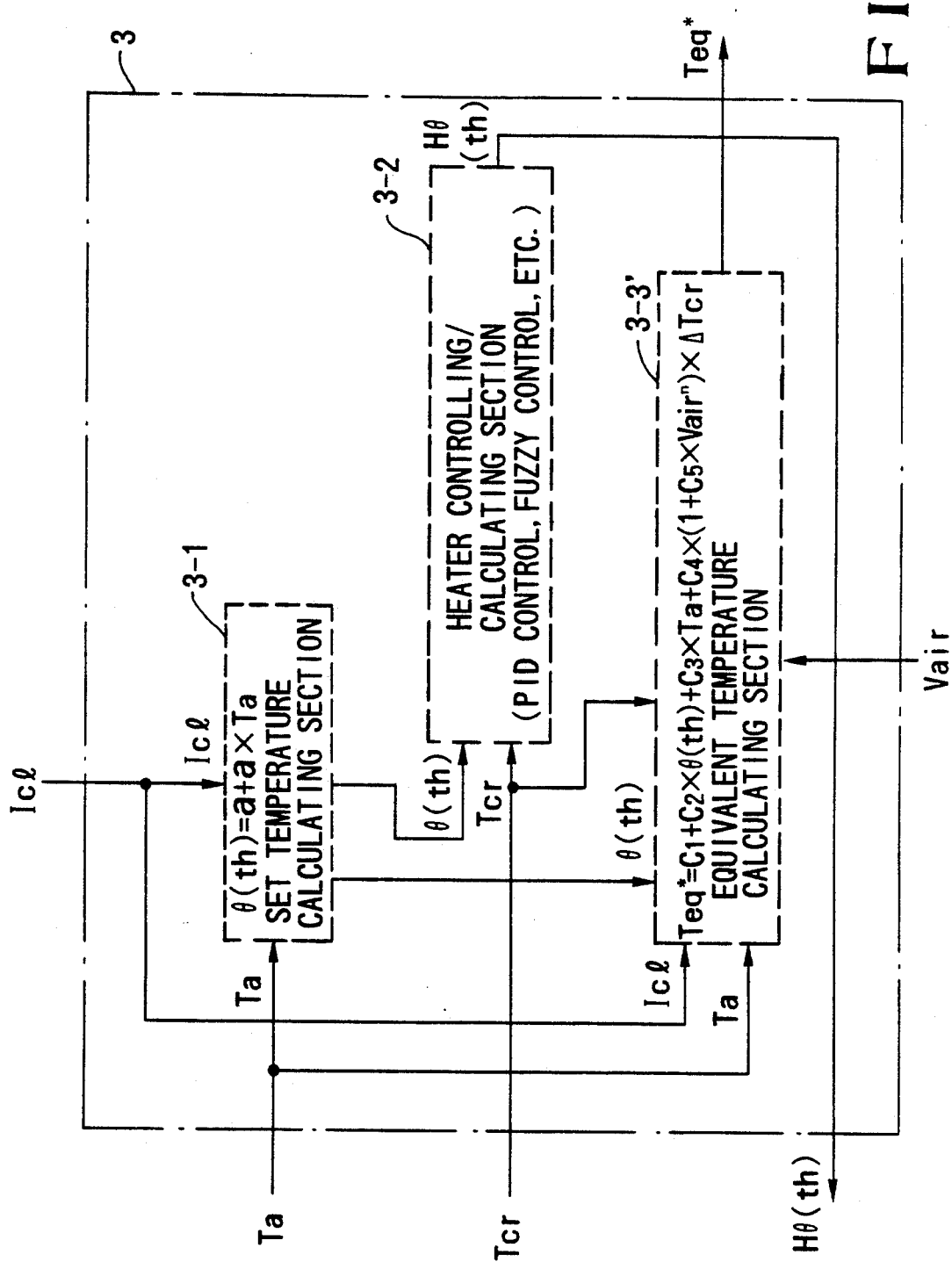

More specifically, in the calculating section 3, as shown in FIG. 1, the set temperature value $\theta_{(th)}$ is calculated by the following equation (2) on the basis of the air temperature Ta and the clothing thermal resistance Icl by using a set temperature calculating section 3-1. Note that values $a_1$ and $a_2$ in equation (2) will be described later.

$$\theta_{(th)} = a_1 + a_2 \times Ta \quad (2)$$

Subsequently, a heater controlling/calculating section 3-2 measures the heater power $H\theta_{(th)}$ (W) while performing PID control or fuzzy control to set the set temperature $\theta_{(th)}$ to be equal to the sensor temperature Tcr. The obtained heater power $H\theta_{(th)}$ (W) is supplied to the environment measuring section 5 through the input section 2.

Figure 3A:
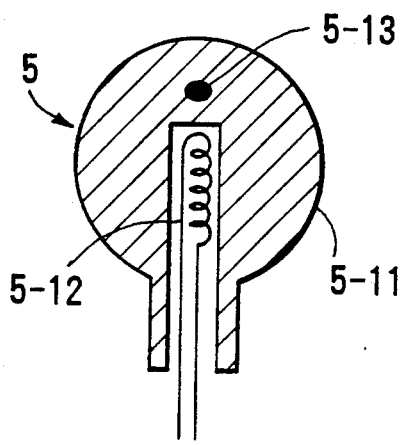
FIGS. 3(a) to 3(d) are schematic longitudinal sectional views, each showing an arrangement of an environment measuring section.
Figure 3B:
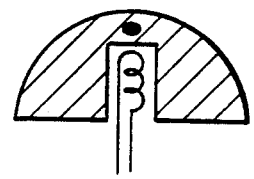
Figure 3C:
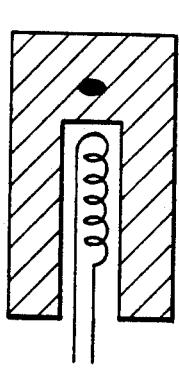
Figure 3D:
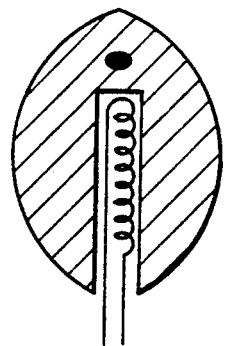

The environment measuring section 5 will be further described below. As shown in, e.g., FIG. 3(a), the environment measuring section 5 comprises a spherical module main body 5-11, a heater 5-12 arranged in the module main body 5-11, and a temperature sensor 5-13 arranged on the module main body 5-11. The module main body 5-11 consists of a metal having high thermal conductivity, such as copper or aluminum. The outer surface of the module main body 5-11 is formed to have high emissivity so as to be sensitive to a radiant temperature Tr. Note that the module main body 5-11 of the environment measuring section 5 may have a hemispherical shape, a cylindrical shape, or an elliptical shape, as shown in FIGS. 3(b), 3(c), and 3(d).

The above-mentioned heater power $H\theta_{(th)}$ is supplied to the heater 5-12 of the environment measuring section 5. The module main body 5-11 is then heated by the heater 5-12 and is controlled such that the sensor temperature Tcr detected by the temperature sensor 5-13 becomes equal to the set temperature $\theta_{(th)}$.

Assume that the sensor temperature Tcr is lower than the set temperature $\theta_{(th)}$, i.e., the module main body 5-11 is in a cooled state in which the heater power $H\theta_{(th)}$ needs to be supplied to the heater 5-12. In this case, in an equivalent temperature calculating section 3-3, an equivalent temperature Teq* is calculated by the following equation (3) on the basis of the air temperature Ta, the clothing thermal resistance Icl, the set temperature $\theta_{(th)}$, and the heater power $H\theta_{(th)}$. Note that $b_1$, $b_2$, $b_3$, and $b_4$ and $b_4$ in equation (2) will be described later.

$$Teq = b_1 + b_2 \times \theta(th) + b_3 \times Ta - b_4 \times H\theta_{(th)} \quad (3)$$

In contrast to this, assume that the sensor temperature Tcr is higher than the set temperature $\theta_{(th)}$, body 5-11 is in a heated state in which the sensor temperature Tcr is higher than the set temperature $\theta_{(th)}$. In this case, an equivalent temperature calculating section 3-3' shown in FIG. 1(b) calculates the equivalent temperature Teq* on the basis of the air temperature Ta, the set temperature $\theta_{(th)}$, the sensor temperature Tcr, a difference $\Delta$Tcr between the sensor velocity Vair, a coefficient $c_1$ expressed in consideration of the clothing thermal resistance Icl, coefficients $c_2$ to $c_5$, and a coefficient n, according to the following equation (4). Note that the coefficients $c_1$ to $c_5$ of equation (4) will be described later.

$$Teq^* = c_1 + c_2 \times \theta_{(th)} + c_3 \times Ta + c_4 \times (1 + c_5 \times Vair^n) \times \Delta Tcr \quad (4)$$

The equivalent temperatures Teq* obtained by the equivalent temperature calculation sections 3-3 and 3-3' are supplied to the display/output section 4 to be displayed.

As described above, according to the thermal sensitivity calculating apparatus 1 of this embodiment, the set temperature $\theta_{(th)}$ is obtained on the basis of the clothing thermal resistance Icl and the air temperature Ta, and the heater power $H\theta_{(th)}$ supplied to the heater 5-12 which is controlled such that the sensor temperature Tcr coincides with the set temperature $\theta_{(th)}$. If the sensor temperature Tcr is lower than the set temperature $\theta_{(th)}$, the equivalent temperature Teq* is calculated on the basis of the air temperature Ta, the clothing thermal resistance Icl, the set temperature $\theta_{(th)}$, and the heater power $H\theta_{(th)}$. If the sensor temperature Tcr is higher than the set temperature the equivalent temperature Teq* is calculated on the basis of the air temperature Ta, the set temperature $\theta_{(th)}$, the difference $\Delta$Tcr between the sensor temperature Tcr and the set temperature $\theta_{(th)}$, the air velocity Vair, the coefficients $c_1$ to $c_5$, and the coefficient n. Therefore, even if the air velocity Vair is high, or the sensor temperature Tcr is higher than the set temperature $\theta_{(th)}$, the equivalent temperature Teq* coincides with the equivalent temperature Teq felt by a human body with high accuracy. This allows accurate measurement of an equivalent temperature.

The mechanism which allows coincidence between the equivalent temperature Teq* and the equivalent temperature Teq with high accuracy will be additionally described below.

Assuming that heater power to be supplied to the environment measuring section 5 is represented by H, the heater power H is dispersed by environmental conditions (the air temperature Ta, the radiant temperature Tr, and the air velocity Vair). If the surface temperature of the module main body 5-11 is T (° C.), then $$H = Hr \times (T - Tr) + A \times Vair^n \times (T - Ta)$$

where Hr=(heat transmission coefficient by radiation) $\times$(area)

$A \times Vair^n$ =(heat transmission coefficient by convection)$\times$(area)

Equation (5) can be rewritten into equation (6):

$$0.45 \times Tr - 0.45 \times \frac{A}{Hr} \times (T - Ta) \times \quad (6)$$

$$Vair^n \times (T - Ta) = 0.45 \times T - \frac{0.45}{Hr} \times H$$

The equivalent temperature Teq felt by a human body is defined by equation (7):

$$Teq = 0.45 \times Tr + 0.55 \times Ta + \quad (7)$$

$$\frac{0.24 - 0.75 \times Vair^{0.5}}{1 + Icl} \times (36.5 - Ta)$$

It is apparent from the comparison between equations (6) and (7) that if T=36.5 is set, and both the left- and right-hand sides of equation (6) are multiplied by $$0.55 \times Ta + \frac{0.24}{1 + Icl} \times (36.5 - Ta)$$

then, the resulting value is substantially equal to the equivalent temperature Teq. Therefore, equation (6) is rewritten as equation (8):

$$0.45 \times Tr + 0.55 \times Ta + \quad (8)$$

-continued $$\frac{\left[0.24 - 0.45 \times A \times \frac{(1 + Icl)}{Hr} \times Vair^n\right]}{1 + Icl} \times (36.5 - Ta) =$$

$$0.45 \times 36.5 + 0.55 \times Ta + \frac{0.24}{1 + Icl} \times$$

$$(36.5 - Ta) - \frac{0.45}{Hr} \times H$$

The difference between equations (8) and (7) resides in $$0.45 \times A \times \frac{(1 + Icl)}{Hr} \times Vair^n \text{ and } 0.75 \times Vair^{0.5}.$$

Since the environment measuring section 5 is small, its air velocity sensitivity inevitably becomes higher than that of a human body. That is, because of the surface effect of the environment measuring section 5, its air velocity sensitivity portion becomes larger than that of a human body to be $$0.45 \times A \times \frac{(1 + Icl)}{Hr} > 0.75$$

Since this inequality sign remains throughout the arithmetic processing, the obtained equivalent temperature is much lower than the equivalent temperature Teq felt by a human body at a place where the air velocity Vair is high. Therefore, an accurate equivalent temperature cannot be obtained.

In this embodiment, therefore, in order to make the air velocity sensitivity of the environment measuring section 5 coincide with that of a human body, equations (8) and (7) are reconsidered in terms of temperature differences (36.5 - Ta) as well as air velocity sensitivity coefficients. As a result, it is found that such coincidence can be achieved by controlling the heater power $H\theta_{(th)}$ supplied to the environment measuring section 5 at a temperature of $\theta_{(th)}°$ C. instead of 36.5° C. so as to establish the following equation:

$$0.45 \times A \times \frac{(1 + Icl)}{Hr} \times Vair^n \times (\theta_{(th)} - Ta) =$$

$$0.75 \times Vair^{0.5} \times (36.5 - Ta)$$

That is, $$\theta_{(th)} = \frac{0.75}{0.45 \times A \times \frac{(1 + Icl)}{Hr}} \times \frac{Vair^{0.5}}{Vair^n} \times (36.5 - Ta) + Ta \quad (9)$$

The coefficient n represents an index value of the air velocity which takes on specific values ranging from 0.1 to 1.0 m/s which correspond to actual states of indoor airflow velocities. Since n normally varies between 0.35 and 0.6 in the range of 0.1 to 1.0 m/s, $Vair^{0.5} \approx Vair^n$ can be established, and the set temperature $\theta_{(th)}$ can be given by $$\theta_{(th)} = 1.667 \times \frac{Hr}{A \times (1 + Icl)} \times (36.5 - Ta) + Ta \quad (10)$$

In this embodiment, the set temperature $\theta_{(th)}$ is obtained on the basis of the clothing thermal resistance Icl and the air temperature Ta, and the heater power $H\theta_{(th)}$ to be supplied to the heater 5-12 which is controlled to make the sensor temperature Tcr coincide with the set temperature $\theta_{(th)}$, thus obtaining the equivalent temperature Teq* by calculating the following formula on the basis of the air temperature Ta, the clothing thermal resistance Icl, the set temperature $\theta_{(th)}$, and the heater power $H\theta_{(th)}$:

$$Teq^* = 0.45 \times \theta_{(th)} + 0.55 \times Ta + \frac{0.24}{(1+Icl)} \times \quad (11)$$

$$(36.5 - Ta) - \frac{0.45}{Hr} \times H\theta_{th}$$

Therefore, even if the air velocity Vair in a normal building office is high, an equivalent temperature can be accurately measured.

If, in equation (10), $$a_1 = 1.667 \times \frac{Hr}{A \times (1+Icl)} \times 36.5$$

$$a_2 = 1 - 1.667 \times \frac{Hr}{A \times (1+Icl)}$$

then, $\theta_{(th)} = a_1 + a_2 \times Ta$.

If, in equation (11), $$b_1 = \frac{0.24}{1+Icl} \times 36.5, \; b_2 = 0.45,$$

$$b_3 = 0.55 - \frac{0.24}{1+Icl}, \; b_4 = +\frac{0.45}{Hr}$$

then, $$Teq^* = b_1 + b_2 \times \theta_{(th)} + b_3 \times Ta - b_4 \times H\theta_{(th)}$$

The mechanism which allows the equivalent temperature Teq* obtained by the equivalent temperature calculating section 3-3' to coincide with the equivalent temperature Teq with high accuracy will be described next.

In a heated state in which the heater power $H\theta_{(th)}$ is zero and the sensor temperature Tcr is higher than the set temperature $\theta_{(th)}$, the module main body 5-11 is heated in some way. In this case, the formulae associated with the environment measuring section 5 are checked again. Since $H\theta_{(th)}=0$, $$0 = Hr \times (Tcr - Tr) + A \times Vair^n \times (Tcr - Ta) \quad (12)$$

Since $Tcr > \theta_{(th)}$, $Tcr = \theta_{(th)} + \Delta Tcr$ ($\Delta Tcr \geq 0$). Consequently, $$0 = Hr \times [(\theta_{(th)} + \Delta Tcr) - Tr] + A \times Vair^n \times [(\theta_{(th)} + \Delta Tcr) - Ta)] \quad (13)$$

Then, $$0 = Hr \times (\theta_{(th)} - Tr) + A \times Vair^n \times (\theta_{(th)} - Ta) + (Hr + A \cdot Vair^n) \times \Delta Tcr \quad (14)$$

Equation (14) can be rewritten into $$0.45 \times Tr - 0.45 \times \frac{A}{Hr} \times Vair^n \times (\theta_{(th)} - Ta) = \quad (15)$$

$$0.45 \times \theta_{(th)} + 0.45 \times \left(1 + \frac{A}{Hr} \times Vair^n\right) \times \Delta Tcr$$

Similar to the rewriting from equation (6) to equation (8), if the left- and right-hand sides of equation (15) are multiplied by $$0.55 \times Ta + \frac{0.24}{(1+Icl)} \times (36.5 - Ta)$$

then, $$0.45 \, Tr + 0.55 \times Ta + \frac{0.24}{1+Icl} \times \quad (16)$$

$$(36.5 - Ta) - 0.45 \times \frac{A}{Hr} \times Vair^n \times$$

$$(\theta_{(th)} - Ta) = 0.45 \times \theta_{(th)} + 0.55 \times Ta +$$

$$\frac{0.24}{1+Icl} \times (36.5 - Ta) + 0.45 \times$$

$$\left(1 + \frac{A}{Hr} \times Vair^n\right) \times \Delta Tcr$$

The left-hand side of equation (16) is $$0.45 \times \frac{A}{Hr} \times Vair^n \times (\theta_{(th)} - Ta) =$$

$$\frac{0.75}{1+Icl} \times Vair^{0.5} \times (36.5 - Ta)$$

This exactly represents the equivalent temperature Teq.

If, therefore, the set temperature $\theta_{(th)}$ is obtained on the basis of the clothing thermal resistance Icl and the air temperature Ta, and the equivalent temperature Teq* is obtained on the basis of the air temperature Ta, the set temperature $\theta_{(th)}$, the difference $\Delta Tcr$ between the sensor temperature Tcr and the set temperature $\theta_{(th)}$, the air velocity Vair, and the clothing thermal resistance Icl, according to the following equation:

$$Teq^* = 0.45 \times \theta_{(th)} + 0.55 \times Ta + \frac{0.24}{1+Icl} \times \quad (17)$$

$$(36.5 - Ta) + 0.45 \times \left(1 + \frac{A}{Hr} \times Vair^n\right) \times \Delta Tcr$$

then, the equivalent temperature Teq can be properly measured even if the sensor temperature Tcr is higher than the set temperature $\theta_{(th)}$.

Note that if, in equation (17), $$c_1 = \frac{0.24}{1+Icl} \times 36.5, \; c_2 = 0.45,$$

$$c_3 = 0.55 - \frac{0.24}{1+Icl}, \; c_4 = 0.45, \text{ and } c_5 = \frac{A}{Hr}, \text{ then}$$

$$Teq^* = c_1 + c_2 \times \theta_{(th)} + c_3 \times Ta + c_4 \times$$

$$(1 + c_5 \times Vair^n) \times \Delta Tcr$$

Although the heated state has been described above, in which the heater power $H\theta_{(th)}$ is zero and the sensor temperature Tcr is higher than the set temperature $\theta_{(th)}$, equation (4) represents only one case in which the heater power $H\theta_{(th)}$ is zero in the following equation (4'):

$$Teq^* = c_1 + c_2 \times \theta_{(th)} + c_3 \times Ta + c_4 \times (1 + c_5 \times Vair^n) \times \Delta Tcr - c_6 \times H\theta_{(th)} \quad (4')$$

where $c_6 = +0.45/Hr$.

Furthermore, in the above embodiment, the air velocity Vair is obtained by using an air velocity sensor. Assuming that the environment measuring section is arranged indoors, even if the air velocity Vair is set to be an arbitrary value, e.g., 0.2 m/s in consideration of the fact that the indoor air velocity mostly ranges from 0.1 to 0.3 m/s, a large error is not produced in the equivalent temperature Teq. That is, the air velocity sensor need not always be used. This ensures the simplification of the apparatus and prevents an increase in cost. Assume that the air velocity Vair is increased. Even in this case, since thermal energy is taken away from the module main body 5-11, and the sensor temperature Tcr eventually becomes lower than the set temperature $\theta_{(th)}$ to start a normal heating operation by means of the heater, the equivalent temperature Teq can be obtained by the scheme in a cooled state.

Figure 4:
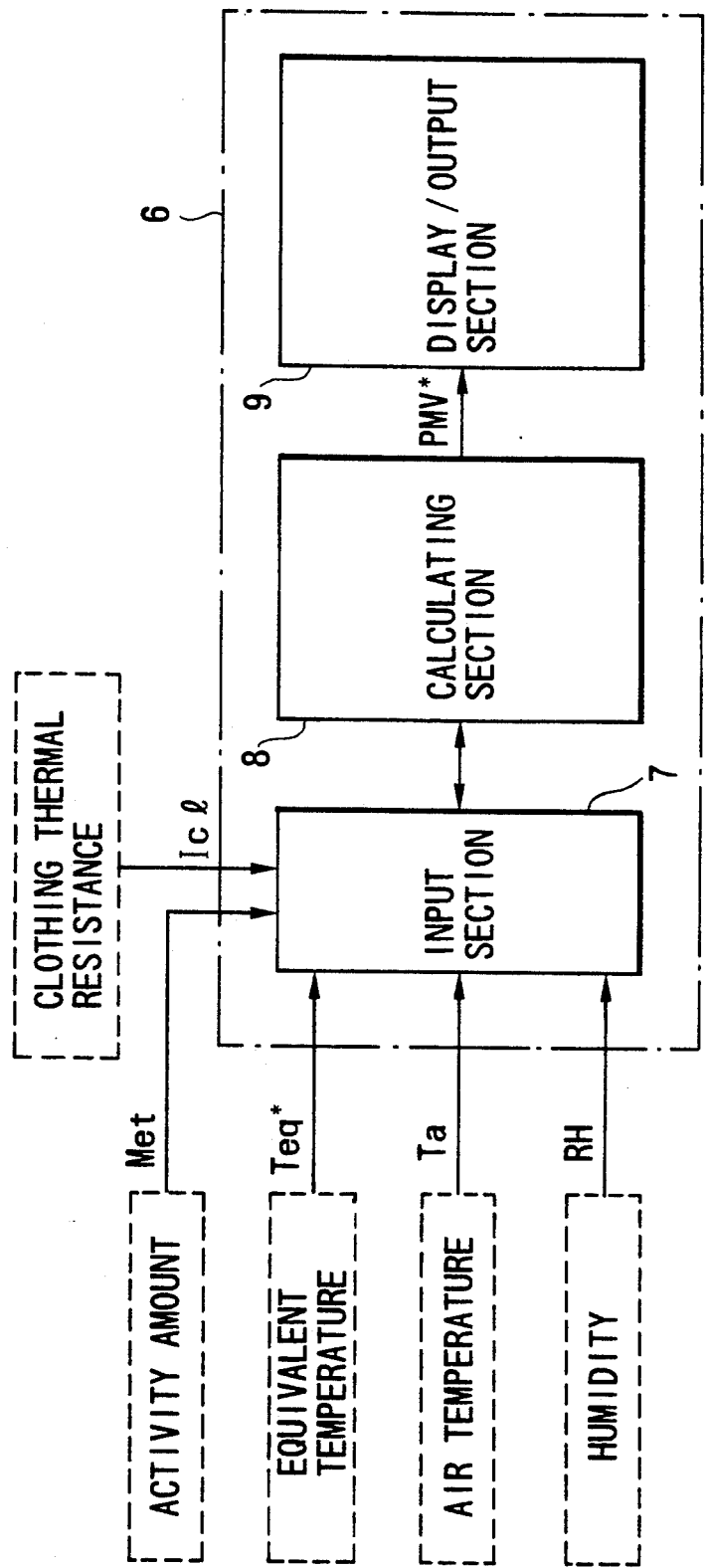
FIG. 4 is a block diagram showing the predicted mean thermal sensitivity calculating apparatus according to another embodiment of the present invention.

FIG. 4 shows a predicted mean thermal sensitivity calculating apparatus according to another embodiment of the present invention.

This predicted mean thermal sensitivity calculating apparatus 6 comprises an input section 7, a calculating section 8, and a display/output section 9. The input section 7 receives an activity amount $M_{et}$ of a human body and a clothing thermal resistance Icl as set values, in addition to an air temperature Ta, a humidity RH, and an equivalent temperature Teq* as detection values. The equivalent temperature Teq* is supplied as an output from the operating section 3 of the thermal sensitivity calculating apparatus 1 shown in FIG. 2. These set and detection values are supplied from the input section 7 to the calculating section 8. The calculating section 8 then calculates a predicted mean sensitivity PMV* according to the following equation (18):

$$PMV^* + \alpha \times LOAD^* \quad (18)$$

where $\alpha = 0.303 \times EXP(-0.036 \times M_{et} \times 58.15) + 0.028$ $LOAD^* = PMVLOAD - Fcl \times (T_{sk} - Teq^*)$ If $M_{et} < 1.0$, then $$PMVLOAD = D_1 + D_2 \times M_{et} - D_3 \times T_{sk} + D_4 \times M_{et} \times Ta + (D_5 + D_6 \times M_{et}) \times RH \times P(Ta)$$

If $M_{et} \geq 1.0$, then $$PMVLOAD = D_1 + D_2 \times M_{et} - D_3 \times T_{sk} + D_4 \times M_{et} \times Ta + (D_5 + D_6 \times M_{et}) \times RH \times P(Ta) - D_7 \times (M_{et} - 1)$$

where the values of the $D_1$ to $D_7$ are set, for example, as follows: $D_1 = 10.2895$, $D_2 = 49.5152$, $D_3 = 0.7808$, $D_4 = 0.08142$, $D_5 = 0.004067$, $D_6 = 0.00133338$, and $D_7 = 24.423$, $T_{sk}$ = skin temperature ($T_{sk} = 35.7 - 0.0275 \times M_{et} \times 58.15$), P(Ta) = absolute water vapor pressure at air temperature Ta [P(Ta) = EXP(18.6686 − 4030.183/(Ta+235))], and Fcl = clothing thermal resistance effect ($Fcl = E_1/(E_2 + E_3 \times Icl)$), where, for example, the values of $E_1$ to $E_3$ are set such that $E_1 = 8.976$, $E_2 = 1$, and $E_3 = 1.466$. The coefficients $E_1$ to $E_3$ and $D_1$ to $D_7$ are eigenvalues calculated on the basis of experimentation and cannot be obtained by direct measurement. These coefficients do not change regardless of the nature or condition of the environment being measured.

In this embodiment, P(Ta) is based on the Antoine equation (saturated water vapor pressure). However, other equations may be used.

Figure 1C:
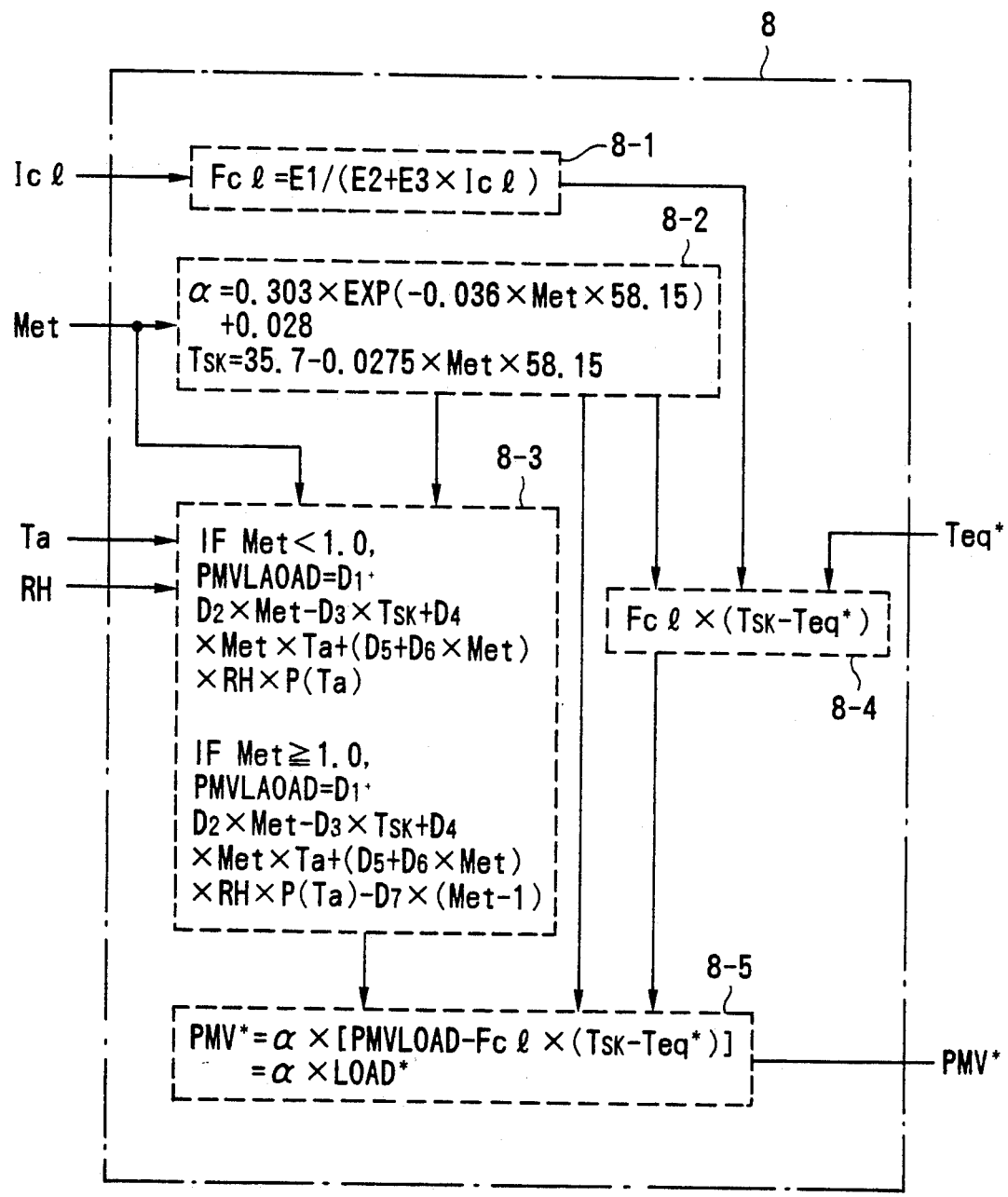
FIG. 1(c) is a block diagram showing the process of arithmetic operations performed by a calculating section in a predicted mean sensitivity calculating apparatus in FIG. 4.

FIG. 1(c) shows the process of arithmetic operations performed by the calculating section 8. More specifically, in an Fcl calculating section 8-1, a thermal resistance effect Fcl is calculated by using the clothing thermal resistance Icl. In an $\alpha \cdot T_{sk}$ calculating section 8-2, the value $\alpha$ and the skin temperature $T_{sk}$ are calculated by using the activity amount $M_{et}$. In a 5 PMVLOAD calculating section 8-3, PMVLOAD is calculated by using the skin temperature $T_{sk}$, the activity amount $M_{et}$, the air temperature Ta, the relative humidity RH, and the absolute water vapor pressure P(Ta). In a calculating section 8-4, $Fcl \times (T_{sk} - Teq^*)$ is calculated by using the thermal resistance effect Fcl, the skin temperature $T_{sk}$, and the equivalent temperature Teq*. Finally, in a PMV* calculating section 8-5, LOAD* is obtained by subtracting $Fcl \times (T_{sk} - Teq^*)$ obtained by the calculating section 8-4 from PMVLOAD obtained by the calculating section 8-3, and the predicted mean thermal sensitivity PMV* is calculated by multiplying the value LOAD* by the value $\alpha$ obtained by the calculating section 8-2.

Equation (18) is obtained by the present applicant by trial and error to simplify the conventional PMV equation (equation (1)). Owing to the synergistic effect based on the fact that the equivalent temperature Teq* can be accurately obtained, the PMV* value obtained by this equation coincides with the PMV value obtained by the conventional PMV equation with considerably high accuracy. Table 1 shows the comparison between PMV and PMV* in the presence of air and in a summertime under the following conditions: $M_{et} = 1.2$, Icl = 0.5, RH = 50%, Ta = Tr = 30° C., and Vair = 0.4 m/s. Table 2 shows the comparison between PMV and PMV* in the presence of air and in a wintertime under the following conditions: $M_{et} = 1.2$, Icl = 1.0, RH = 50%, Ta = Tr = 18° C. and Vair = 0.4 m/s. It is apparent from these tables that PMV and PMV* coincide with each other with only a small error (about 0.1).

TABLE 1

| Data associated with PMV | | Data associated with PMV* | |
| --- | --- | --- | --- |
| PMV | 1.367 | PMV* | 1.255 |
| LOAD | 25.89 | LOAD* | 24.15 |
| R + C | 24.52 | R* + C* | 26.95 |

TABLE 2

| Data associated with PMV | | Data associated with PMV* | |
| --- | --- | --- | --- |
| PMV | −1.304 | PMV* | −1.466 |
| LOAD | −24.69 | LOAD* | 28.21 |
| R + C | 69.55 | R* + C* | 73.27 |

In the above tables, "LOAD" indicates a collective portion in equation (1) expressed as $PMV = (0.303e^{-0.036M} + 0.028) \times LOAD$. In addition, in $R + C = 3.96 \times 10^{-8} \cdot fcl \cdot \{(Tcl + 273)^4 - (Tr + 273)^4\} + fcl \cdot hc \cdot (Tcl - Ta)$, "$R^* + C^*$" indicates $Fcl \times (T_{sk} - Teq^*)$.

As is apparent from the above description, according to the present invention, the sensor temperature Tcr is controlled to be equal to the set temperature $\theta_{(th)}$ which is not constant and changes depending on environmental conditions. The sensor temperature Tcr is higher than the set temperature $\theta_{(th)}$, the equivalent temperature Teq* is calculated on the basis of the air temperature Ta, the set temperature $\theta_{(th)}$, the difference ΔTcr, the air velocity Vair, the coefficients $c_1$ to $c_5$, and the coefficient n. If the sensor temperature Tcr is lower than the set temperature $\theta_{(th)}$, the equivalent temperature Teq* is calculated on the basis of the air temperature Ta, the set temperature $\theta_{(th)}$, the thermal energy $H\theta_{(th)}$, and the coefficients $b_1$ to $b_4$. Therefore, even if the air velocity Vair is high, or the sensor temperature Tcr is higher than the set temperature $\theta_{(th)}$, the calculated equivalent temperature Teq* coincides with the equivalent temperature Teq felt by a human body with high accuracy, thus allowing accurate measurement of the equivalent temperature Teq.

In addition, since the equivalent temperature Teq* which coincides with the equivalent temperature Teq with high accuracy is used, the predicted mean thermal sensitivity PMV* can be accurately obtained.

What is claimed is:

1. A method of calculating thermal sensitivity felt by a person in an environment using an environment measuring section disposed in the environment, the environment measuring section disposed in the environment, the environment measuring section having an associated temperature sensor for detecting a surface temperature Tcr of the environment measuring section and an associated heating means for adjusting the surface temperature Tcr, comprising the steps of:

calculating a set temperature $q_{(th)}$ on the basis of an air temperature Ta and a clothing thermal resistance Icl input to a thermal sensitivity calculating section;

supplying thermal energy information $Hq_{(th)}$ from a thermal energy control section to the associated heating means for heating the associated sensor;

heating the associated sensor to set the surface temperature Tcr of the associated sensor to be equal to the set temperature $q_{(th)}$;

supplying a thermal energy information value representing an amount of power H supplied to the heating means to maintain the surface temperature Tcr substantially the same as the set temperature $q_{(th)}$ from the thermal energy control section to the thermal sensitivity calculating section; and calculating an equivalent temperature Teq* on the basis of the air temperature Ta, the set temperature $q_{(th)}$, the thermal energy information value, and coefficients $b_1$ to $b_4$, according to the following equation (a), when the sensor temperature Tcr is lower than the set temperature $q_{(th)}$, and calculating the equivalent temperature Teq* on the basis of the air temperature Ta, the set temperature $q_{(th)}$, a difference ΔTcr between the sensor temperature Tcr and the set temperature $q_{(th)}$, an air velocity Vair, the thermal energy information $Hq_{(th)}$ representing the amount of power H supplied to the heating means, a coefficient $c_1$ expressed in consideration of the clothing thermal resistance Icl, coefficients $c_2$ to $c_6$, and a coefficient n, according to the following equation (b), when the sensor temperature Tcr is higher than the set temperature $q_{(th)}$, $$Teq^* = b_1 + b_2 \times \theta_{(th)} + b_3 \times Ta - b_4 \times H\theta_{(th)} \qquad (a)$$

$$Teq^* = c_1 + c_2 \times \theta_{(th)} + c_3 \times Ta + c_4 \times (1 + c_5 + Vair^n) \times \Delta Tcr - c_6 \times H\theta_{(th)} \qquad (b)$$

where $$b_1 = \frac{0.24}{1 + Icl} \times 36.5, \; b_2 = 0.45, \; b_3 = 0.55 - \frac{0.24}{1 + Icl},$$

$$b_4 = +\frac{0.45}{Hr}; \text{ and } c_1 = \frac{0.24}{1 + Icl} \times 36.5,$$

$$c_2 = 0.45, \; c_3 = 0.55 - \frac{0.24}{1 + Icl}, \; c_4 = 0.45,$$

$$c_5 = \frac{A}{Hr}, \; c_6 = +\frac{0.45}{Hr}.$$

2. A method of calculating predicted mean thermal sensitivity felt by a person in an environment using an environment measuring section disposed in the environment, the environment measuring section having an associated temperature sensor for detecting a surface temperature Tcr of the environment measuring section and an associated heating means for adjusting the surface temperature Tcr, comprising the steps of:

calculating a set temperature $q_{(th)}$ on the basis of an air temperature Ta and a clothing thermal resistance Icl input to a thermal sensitivity calculating section;

supplying thermal energy information $Hq_{(th)}$ from a thermal energy control section to the associated heating means for heating the associated sensor;

heating the associated sensor to set the surface temperature Tcr of the associated sensor to be equal to the set temperature $q_{(th)}$;

supplying a thermal energy information value representing an amount of power H supplied to the heating means to maintain the surface temperature Tcr substantially the same as the set temperature $q_{(th)}$ from the thermal energy control section to the thermal sensitivity calculating section;

calculating an equivalent temperature Teq* on the basis of the air temperature Ta, the set temperature $q_{(th)}$, the thermal energy information value, and coefficients $b_1$ to $b_4$, according to the following equation (a), when the sensor temperature Tcr is lower than the set temperature $q_{(th)}$, and calculating the equivalent temperature Teq on the basis of the air temperature, the set temperature $q_{(th)}$, a difference ΔTcr between the sensor temperature Tcr and the set temperature $q_{(th)}$, an air velocity Vair, the thermal energy information $Hq_{(th)}$ representing the amount of power H supplied to the heating means, a coefficient $c_1$ expressed in consideration of the clothing thermal resistance Icl, coefficients $c_2$ to $c_6$, and a coefficient n, according to the following equation (b), when the sensor temperature Tcr is higher than the set temperature $q_{(th)}$;

supplying the equivalent temperature Teq* to a predicted mean thermal sensitivity calculating section; and calculating predicted mean thermal sensitivity PMV* on the basis of the obtained equivalent temperature Teq*, a humidity RH, an activity amount $M_{et}$, a skin temperature $T_{sk}(T_{sk} = 35.7 - 0.0275 \times M_{et} \times 58.15)$, the air temperature Ta, an absolute water vapor pressure P(Ta) at the air temperature Ta, the clothing thermal resistance Icl, a thermal resistance effect Fcl (Fcl=E$_1$/(E$_2$+E$_3$×Icl)) based on coefficients E$_1$ to E$_3$, and coefficients D$_1$ to D$_7$, according to the following equation (c), $$\text{Teq}^* = b_1 + b_2 \times \theta_{(th)} + b_3 \times Ta - b_4 \times H\theta_{(th)} \quad (a)$$

$$\text{Teq}^* = c_1 + c_2 \times \theta_{(th)} + c_3 \times Ta + c_4 \times (1+c_5 + \text{Vair}^n) \times \Delta Tcr - c_6 \times H\theta_{(th)} \quad (b)$$

$$\text{PMV}^* = a \times \text{LOAD}^* \quad (c)$$

where $$\text{Teq}^* = b_1 + b_2 \times \theta_{(th)} + b_3 \times Ta - b_4 \times H\theta_{(th)} \quad (a)$$
$$\text{Teq}^* = c_1 + c_2 \times \theta_{(th)} + c_3 \times Ta + c_4 \times \quad (b)$$
$$(1 + c_5 \times \text{Vair}^n) \times \Delta Tcr - c_6 \times H\theta_{(th)}$$
$$\text{PMV}^* = a \times \text{LOAD}^* \quad (c)$$

where $$b_1 = \frac{0.24}{1+Icl} \times 36.5,\ b_2 = 0.45,$$

$$b_3 = 0.55 - \frac{0.24}{1+Icl},\ b_4 = +\frac{0.45}{Hr};$$

$$c_1 = \frac{0.24}{1+Icl} \times 36.5,\ c_2 = 0.45,$$

$$c_3 = 0.55 - \frac{0.24}{1+Icl},\ c_4 = 0.45,$$

$$c_5 = \frac{A}{Hr},\ c_6 = +\frac{0.45}{Hr};$$

a=0.303×EXP(−0.036'M$_{et}$×58.15)+0.028; E$_1$=8.976, E$_2$=1, and E$_3$=1.466; and if M$_{et}$<1.0, then $$\text{LOAD}^* = D_1 + D_2 \times M_{et} - D_3 \times T_{sk} + D_4 \times M_{et} \times Ta + (D_5 + D_6 \times M_{et}) \times RH \times P(Ta) - Fcl \times (T_{sk} - \text{Teq}^*),$$

where

D1=10.2895, D2=49.5152, D3=0.7808,
D4−0.08142, D5=0.004067, D6=0.00133338 and
D7=24.423;

and if Met≥1.0, then $$\text{LOAD}^* = D_1 + D_2 \times M_{35} - D_3 \times T_{sk} + D_4 \times M_{et} \times Ta + (D_5 + D_6 \times M_{et}) \times RH \times P(Ta) - D_7 \times (M_{et} - 1) - Fcl \times (T_{sk} - \text{Teq}^*),$$

where

D1=10.2895, D2=49.5152, D3=0.7808,
D4=0.08142, D5=0.004067, D6=0.00133338 and
D7=24.423.

3. A thermal sensitivity calculating apparatus for calculating thermal sensitivity felt by a person in an environment arranged with respect to an environment measuring section having heating means capable of supplying heat to the environment to adjust a sensor temperature Tcr of an associated sensor, comprising:
set temperature calculating means for calculating a set temperature $\theta_{(th)}$ on the basis of an air temperature Ta and a clothing thermal resistance Icl;
thermal energy control means for supplying thermal energy information H$\theta_{(th)}$ to said heating means so as to set the sensor temperature Tcr to be equal to the set temperature $\theta_{(th)}$; and
thermal sensitivity calculating means for calculating an equivalent temperature Teq* on the basis of the air temperature Ta, the set temperature $\theta_{(th)}$, the thermal energy information H$\theta_{(th)}$ representing an amount of power H supplied to the heating means, and coefficients b$_1$ to b$_4$, according to the following equation (a), when the sensor temperature Tcr is lower than the set temperature $\theta_{(th)}$, and calculating the equivalent temperature Teq* on the basis of the air temperature Ta, the set temperature $\theta_{(th)}$, a difference ΔTcr between the sensor temperature Tcr and the set temperature $\theta_{(th)}$, an air velocity Vair, the thermal energy information H$\theta_{(th)}$ representing the amount of power H supplied to the heating means, a coefficient c$_1$ expressed in consideration of the clothing thermal resistance Icl, coefficients c$_2$ to c$_6$, and a coefficient n, according to the following equation (b), when the sensor temperature Tcr is higher than the set temperature $\theta_{(th)}$, $$\text{Teq}^* b_1 + b_2 \times \theta_{(th)} + b_3 \times Ta - b_4 \times H\theta_{(th)} \quad (a)$$

$$\text{Teq}^* - c_1 + c_2 \times \theta_{(th)} + c_3 \times Ta + c_4 \times (1+c_5 \times \text{Vair}^n) \times \Delta Tcr - c_6 \times H\theta_{(th)} \quad (b)$$

where $$b_1 = \frac{0.24}{1+Icl} \times 36.5,\ b_2 = 0.45,\ b_3 = 0.55 - \frac{0.24}{1+Icl},$$

$$b_4 = +\frac{0.45}{Hr};\ \text{and}\ c_1 = \frac{0.24}{1+Icl} \times 36.5,$$

$$c_2 = 0.45,\ c_3 = 0.55 - \frac{0.24}{1+Icl},\ c_4 = 0.45,$$

$$c_5 = \frac{A}{Hr},\ c_6 = +\frac{0.45}{Hr}.$$

4. A predicted mean thermal sensitivity calculating apparatus for calculating predicted mean thermal sensitivity felt by a person in an environment comprising:
a thermal sensitivity calculating apparatus arranged with respect to an environment measuring section having heating means capable of supplying heat to the environment to adjust a sensor temperature Tcr of an associated sensor, said thermal sensitivity calculating apparatus including
set temperature calculating means for calculating a set temperature $\theta_{(th)}$ on the basis of an air temperature Ta and a clothing thermal resistance Icl,
thermal energy control means for supplying thermal energy information H$\theta_{(th)}$ to said heating means so as to set the sensor temperature Tcr to be equal to the set temperature $\theta_{(th)}$; and
thermal sensitivity calculating means for calculating an equivalent temperature Teq* on the basis of the air temperature Ta, the set temperature $\theta_{(th)}$, the thermal energy information H$\theta_{(th)}$ representing an amount of power H supplied to the heating means, and coefficients b$_1$ to b$_4$, according to the following equation (q), when the sensor temperature Tcr is lower than the set temperature $\theta_{(th)}$, and calculating the equivalent temperature Teq* on the basis of the air temperature Ta, the set temperature $\theta_{(th)}$, a difference ΔTcr between the sensor temperature Tcr and the set temperature $\theta_{(th)}$, an air velocity Vair, the thermal energy information H$\theta_{(th)}$ representing the amount of power H supplied to the heating means, a coefficient c$_1$ expressed in consideration of the clothing thermal resistance Icl, coefficients $c_2$ to $c_6$, and a coefficient n, according to the following equation (b), when the sensor temperature Tcr is higher than the set temperature $\theta_{(th)}$; and predicted means thermal sensitivity calculating means for calculating predicted mean thermal sensitivity PMV* on the basis of the equivalent temperature Teq* obtained by said thermal sensitivity calculating apparatus, a humidity RH, an activity amount $M_{et}$, a skin temperature $T_{sk}$ ($T_{sk} = 35.7 - 0.0275 \times M_{et} \times 58.15$), the air temperature Ta, an absolute water vapor pressure P(Ta) at the air temperature Ta, the clothing thermal resistance Icl, a thermal resistance effect Fcl (Fcl = $E_1$/($E_2 + E_3 \times$ Icl)) based on coefficients $E_1$ to $E_3$, and coefficients $D_1$ to $D_7$, according to the following equation (c), $$\text{Teq}^* = b_1 + b_2 \times \theta_{(th)} + b_3 \times Ta - b_4 \times H\theta_{(th)} \quad (a)$$

$$\text{Teq}^* = c_1 + c_2 \times \theta_{(th)} + c_3 \times Ta + c_4 \times (1 + c_5 \times Vair^n) \times \Delta Tcr - c_6 \times H\theta_{(th)} \quad (b)$$

$$\text{PMV}^* = \alpha \times \text{LOAD}^* \quad (c)$$

where $$b_1 = \frac{0.24}{1 + Icl} \times 36.5, \ b_2 = 0.45,$$

$$b_3 = 0.55 - \frac{0.24}{1 + Icl}, \ b_4 = +\frac{0.45}{Hr};$$

$$c_1 = \frac{0.24}{1 + Icl} \times 36.5, \ c_2 = 0.45,$$

$$c_3 = 0.55 - \frac{0.24}{1 + Icl}, \ c_4 = 0.45,$$

$$c_5 = \frac{A}{Hr}, \ c_6 = +\frac{0.45}{Hr};$$

$\alpha = 0.303 \times \text{EXP}(-0.036 \times M_{et} \times 58.15) + 0.028$;
$E_1 = 8.976, E_2 = 1,$ and $E_3 = 1.466$;
and if $M_{et} < 1.0$, then $$\text{LOAD}^* = D_1 + D_2 \times M_{et} - D_3 \times T_{sk} + D_4 \times M_{et} \times Ta + (D_5 + D_6 \times M_{et}) \times RH \times P(Ta) - Fcl \times (T_{sk} - \text{Teq}^*),$$

where $D_1 = 10.2895, D_2 = 49.5152, D_3 = 0.7808,$
$D_4 = 0.08142, D_5 = 0.004067, D_6 = 0.00133338$ and $D_7 = 24.423;$ and if Met $\geq 1.0$, then $$\text{LOAD}^* = D_1 + D_2 \times M_{35} - D_3 \times T_{sk} + D_4 \times M_{et} \times Ta + (D_5 + D_6 \times M_{et}) \times RH \times P(Ta) - D_7 \times (M_{et} - 1) - Fcl \times (T_{sk} - \text{Teq}^*),$$

where $D_1 = 10.2895, D_2 = 49.5152, D_3 = 0.7808,$
$D_4 = 0.08142, D_5 = 0.004067, D_6 = 0.00133338$ and $D_7 = 24.423.$ 5. A thermal sensitivity calculating apparatus for calculating thermal sensitivity felt by a person in an environment, comprising:

an environment measuring section disposed within the environment for integral detection of an air temperature Ta, a radiant temperature Tr and an air velocity Vair, the environment measuring section having an associated sensor for detecting a surface temperature Tcr of the environment measuring section and heating means capable of supplying heat to the environment measuring section to adjust the surface temperature Tcr; and a thermal sensitivity calculating section having set temperature calculating means for calculating a set temperature $q_{(th)}$ on the basis of the air temperature Ta and a clothing thermal resistance Icl, thermal energy control means for supplying thermal energy information $Hq_{(th)}$ to the heating means so as to set the surface temperature Tcr to be equal to the set temperature $q_{(th)}$, and thermal sensitivity calculating means for calculating an equivalent temperature Teq* on the basis of the air temperature Ta, the set temperature $q_{(th)}$, a thermal energy information value representing an amount of thermal energy information $Hq_{(th)}$ supplied to the heating means, and coefficients $b_1$ to $b_4$, according to the following equation (a), when the surface temperature Tcr is lower than the set temperature $q_{(th)}$, and calculating the equivalent temperature Teq* on the basis of the air temperature Ta, the set temperature $q_{(th)}$, a difference $\Delta$Tcr between the surface temperature Tcr and the set temperature $q_{(th)}$, the air velocity Vair, the thermal energy information $Hq_{(th)}$ representing the amount of power H supplied to the heating means, a coefficient $C_1$ expressed in consideration of the clothing thermal resistance Icl, coefficients $c_2$ to $c_6$, and a coefficient n, according to the following equation (b), when the surface temperature Tcr is higher than the set temperature $q_{(th)}$, $$\text{Teq}^* = b_1 + b_2 \times \theta_{(th)} + b_3 \times Ta - b_4 \times H\theta_{(th)} \quad (a)$$

$$\text{Teq}^* = c_1 + c_2 \times \theta_{(th)} + c_3 \times Ta + c_4 \times (1 + c_5 \times Vair^n) \times \Delta Tcr - c_6 \times H\theta_{(th)} \quad (b)$$

where $$b_1 = \frac{0.24}{1 + Icl} \times 36.5, \ b_2 = 0.45,$$

$$b_3 = 0.55 - \frac{0.24}{1 + Icl}, \ b_4 = +\frac{0.45}{Hr}; \text{ and}$$

$$c_1 = \frac{0.24}{1 + Icl} \times 36.5, \ c_2 = 0.45,$$

$$c_3 = 0.55 - \frac{0.24}{1 + Icl}, \ c_4 = 0.45,$$

$$c_5 = \frac{A}{Hr}, \ c_6 = +\frac{0.45}{Hr}.$$

6. The apparatus of claim 5, wherein the associated sensor and the heating means of the environment measuring section are both disposed within a main body of the environment measuring section.

7. The apparatus of claim 5, wherein the environment measuring section comprises a main body formed from a metal having high thermal conductivity, the main body having a surface of high emissivity so as to be sensitive to the radiant temperature.

8. The apparatus of claim 5, wherein the apparatus further comprises an air temperature sensor and a humidity sensor disposed within the environment for separately detecting the air temperature and a humidity of the environment, respectively.

9. A predicted thermal sensitivity calculating apparatus for calculating thermal sensitivity felt by a person in an environment, comprising:

an environment measuring section disposed within the environment for integral detection of an air temperature Ta, a radiant temperature Tr and an air velocity Vair, the environment measuring section having an associated sensor for detecting a surface temperature Tcr of the environment measuring section and heating means capable of supplying heat to the environment measuring section to adjust the surface temperature Tcr;

a thermal sensitivity calculating section having
set temperature calculating means for calculating a set temperature $q_{(th)}$ on the basis of the air temperature Ta and a clothing thermal resistance Icl,
thermal energy control means for supplying thermal energy information $Hq_{(th)}$ to the heating means so as to set the surface temperature Tcr to be equal to the set temperature $q_{(th)}$, and
thermal sensitivity calculating means for calculating an equivalent temperature $Teq^*$ on the basis of the air temperature Ta, the set temperature $q_{(th)}$, a thermal energy information value representing an amount of thermal energy information $Hq_{(th)}$ supplied to the heating means, and coefficients $b_1$ to $b_4$, according to the following equation (a), when the surface temperature Tcr is lower than the set temperature $q_{(th)}$, and calculating the equivalent temperature $Teq^*$ on the basis of the air temperature Ta, the set temperature $q_{(th)}$, a difference $\Delta Tcr$ between the surface temperature Tcr and the set temperature $q_{(th)}$, the air velocity Vair, the thermal energy information $Hq_{(th)}$ representing the amount of power H supplied to the heating means, a coefficient $c_1$ expressed in consideration of the clothing thermal resistance Icl, coefficients $c_2$ to $c_6$, and a coefficient n, according to the following equation (b), when the surface temperature Tcr is higher than the set temperature $q_{(th)}$; and predicted mean thermal sensitivity calculating section for calculating predicted mean thermal sensitivity $PMV^*$ on the basis of the equivalent temperature $Teq^*$ obtained by the thermal sensitivity calculating section, a humidity RH, an activity amount $M_{et}$, a skin temperature $T_{sk}(T_{sk}=35.7-0.0275 \times M_{et} \times 58.15)$, the air temperature Ta, an absolute water vapor pressure P(Ta) at the air temperature Ta, the clothing thermal resistance Icl, a thermal resistance effect Fcl ($Fcl=E_1/(E_2+E_3 \times Icl)$) based on coefficients $E_1$ to $E_3$, and coefficients $D_1$ to $D_7$, according to the following equation (c), $$Teq^* = b_1 + b_2 \times \theta_{(th)} + b_3 \times Ta - b_4 \times H\theta_{(th)} \qquad (a)$$

$$Teq^* = c_1 + c_2 \times \theta_{(th)} + c_3 \times Ta + c_4 \times (1 + c_5 \times Vair^n) \times \Delta Tcr - c_6 \times H\theta_{(th)} \qquad (b)$$

$$PMV^* = a \times LOAD^* \qquad (c)$$

where $$b_1 = \frac{0.24}{1 + Icl} \times 36.5, \quad b_2 = 0.45,$$

$$b_3 = 0.55 - \frac{0.24}{1 + Icl}, \quad b_4 = +\frac{0.45}{Hr};$$

$$c_1 = \frac{0.24}{1 + Icl} \times 36.5, \quad c_2 = 0.45,$$

$$c_3 = 0.55 - \frac{0.24}{1 + Icl}, \quad c_4 = 0.45,$$

$$c_5 = \frac{A}{Hr}, \quad c_6 = +\frac{0.45}{Hr};$$

$a = 0.303 \times EXP(-0.036 \times M_{et} \times 58.15) + 0.028$; and
$E_1 = 8.976$, $E_2 = 1$, and $E_3 = 1.466$;
and if $M_{et} < 1.0$, then $$LOAD^* = D_1 + D_2 \times M_{et} - D_3 \times T_{sk} + D_4 \times M_{et} \times Ta + (D_5 + D_6 \times M_{et}) \times RH \times P(Ta) - Fcl \times (T_{sk} - Teq^*),$$

where $D_1 = 10.2895$, $D_2 = 49.5152$, $D_3 = 0.7808$,
$D_4 = 0.08142$, $D_5 = 0.004067$, $D_6 = 0.00133338$ and
$D_7 = 24.423$;

and if $M_{et} \geq 1.0$, then $$LOAD^* = D_1 + D_2 \times M_{35} - D_3 \times T_{sk} + D_4 \times M_{et} \times Ta + (D_5 + D_6 \times M_{et}) \times RH \times P(Ta) - D_7 \times (M_{et} - 1) - Fcl \times (T_{sk} - Teq^*),$$

where $D_1 = 10.2895$, $D_2 = 49.5152$, $D_3 = 0.7808$,
$D_4 = 0.08142$, $D_5 = 0.004067$, $D_6 = 0.00133338$ and
$D_7 = 24.423$.

10. The apparatus of claim 9, wherein the associated sensor and the heating means of the environment measuring section are both disposed within a main body of the environment measuring section.

11. The apparatus of claim 9, wherein the environment measuring section comprises a main body formed from a metal having high thermal conductivity, the main body having a surface of high emissivity so as to be sensitive to the radiant temperature.

12. The apparatus of claim 9, wherein the apparatus further comprises an air temperature sensor and a humidity sensor disposed within the environment for separately detecting the air temperature and a humidity of the environment, respectively.

* * * * *